US012291694B2

(12) United States Patent
Kalagasidis Krusic et al.

(10) Patent No.: US 12,291,694 B2

(45) Date of Patent: May 6, 2025

(54) DYE SCAVENGER AND METHOD OF PRODUCTION OF DYE SCAVENGER

(71) Applicants: Melina Kalagasidis Krusic, Belgrade (RS); Nedeljko Milosavljevic, Belgrade (RS); Marija Lucic Skoric, Belgrade (RS)

(72) Inventors: Melina Kalagasidis Krusic, Belgrade (RS); Nedeljko Milosavljevic, Belgrade (RS); Marija Lucic Skoric, Belgrade (RS)

(73) Assignees: Melina Kalagasidis Krusic, Belgrade (RS); Nedeljko Milosavljevic, Belgrade (RS); Marija Lucic Skoric, Belgrade (RS)

( * ) Notice: Subject to any disclaimer, the term of this patent is extended or adjusted under 35 U.S.C. 154(b) by 1001 days.

(21) Appl. No.: 17/294,387

(22) PCT Filed: Dec. 10, 2018

(86) PCT No.: PCT/RS2018/000019

§ 371 (c)(1),
(2) Date: May 14, 2021

(87) PCT Pub. No.: WO2020/122743

PCT Pub. Date: Jun. 18, 2020

(65) Prior Publication Data

US 2022/0010238 A1 Jan. 13, 2022

(51) Int. Cl.

| | |
|---|---|
| ***C11D 3/20*** | (2006.01) |
| ***C11D 3/00*** | (2006.01) |
| ***C11D 3/22*** | (2006.01) |
| ***C11D 3/38*** | (2006.01) |
| ***C11D 7/44*** | (2006.01) |
| ***C11D 7/46*** | (2006.01) |
| ***C11D 17/00*** | (2006.01) |
| ***C11D 17/04*** | (2006.01) |

(52) U.S. Cl.

CPC .......... *C11D 3/0021* (2013.01); *C11D 3/2096* (2013.01); *C11D 3/222* (2013.01); *C11D 17/003* (2013.01); *C11D 17/048* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 5,380,447 | A | 1/1995 | Kirk et al. | |
| 2010/0316715 | A1* | 12/2010 | Andersson | A61L 27/20 435/395 |
| 2014/0154212 | A1* | 6/2014 | Tanzi | A61L 27/52 514/774 |
| 2017/0224613 | A1* | 8/2017 | Wu | A61K 9/0014 |
| 2019/0169374 | A1* | 6/2019 | Ramsburg | B09C 1/00 |

FOREIGN PATENT DOCUMENTS

| | | | |
|---|---|---|---|
| ES | 2367384 | A1 | 11/2011 |
| WO | 2016109847 | A1 | 7/2016 |

OTHER PUBLICATIONS

Mi et al., Synthesis and Characterization of Biodegradable TPP/Genipin Co-Crosslinked Chitosan Gel Beads, Polymer, vol. 44, pp. 6521-6530 (Year: 2003).*

Esquena Moret et al. WO 2011128476 (Year: 2011), with English Translation.*

CN 106750573 A May 2017.*

* cited by examiner

*Primary Examiner* — Lorna M Douyon

(74) *Attorney, Agent, or Firm* — ROTHWELL, FIGG, ERNST & MANBECK, P.C.

(57) ABSTRACT

A dye scavenger is provided that comprises a biodegradable hydrogel formed of at least one polymer chemically cross-linked by a cross-linker. The dye scavenger removes dyes rapidly, is prepared in an environmentally friendly manner, is reusable and biodegradable and can optionally incorporate other features of laundry compositions. The dye scavenger is useful for preventing dye transfer between fabrics in laundry and for removing dyes from waste water.

20 Claims, 1 Drawing Sheet

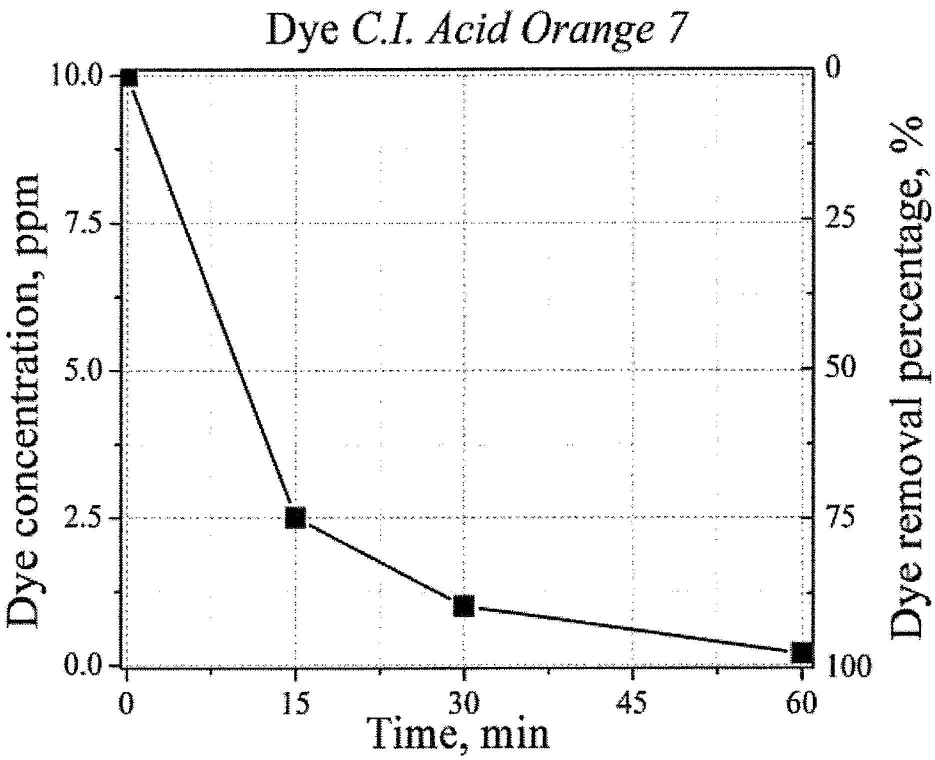
Dye *C.I. Acid Orange 7*
Dye concentration, ppm
10.0
7.5
5.0
2.5
0.0
0
15
30
45
60
Time, min
Dye removal percentage, %
0
25
50
75
100

DYE SCAVENGER AND METHOD OF PRODUCTION OF DYE SCAVENGER

FIELD OF THE INVENTION

The present invention relates to a dye scavenger for removal of dyes or colourants from a solution. More specifically, the present invention may be used in laundry applications for removal of dyes or colourants from wash water before re-deposition onto other fabrics. The present invention also relates to a method of preparing the dye scavenger, a dye-scavenging device using the dye scavenger and a laundry composition comprising the dye scavenger.

BACKGROUND OF THE INVENTION

It is well-known that washing dyed or coloured fabrics can cause dyes or colourants (referred to as "dyes" hereinafter) to be released into wash water. The amount of dye released is influenced by the colourfastness of the fabric, the type of dye, and also by the conditions under which the fabric is being washed, such as the type and concentration of detergent, the temperature of the wash, the pH of the wash, and the mechanical efficiency of the agitation process.

Once released, the dyes can transfer between fabrics being washed together. Such 'fugitive dyes' or 'stray dyes' can be deposited onto the same fabric (the source fabric) or other fabrics being washed with the source fabric. The release and deposition of the dye can lead to undesirable discolouration or colouration of fabrics resulting in unsatisfactory appearance after washing. Similarly, soil and dirt released from a fabric into the wash water can be deposited onto the source fabric or other fabrics being washed with the source fabric.

A well-known solution to the aforementioned problem is to sort fabrics into like-coloured groups before washing. This is time consuming and inconvenient. Moreover, clothes regularly comprise several colours on the same item, where sorting cannot help.

Several methods have therefore been developed to avoid dye transfer during washing. For example, dye-transfer inhibiting polymers have been added to detergents or fabric softener formulations (see, for example, WO 1999/015614 A1, WO 96/20996 A1, US 94/06849, US 93/10542, US 93/10451, US 93/10451 and U.S. Pat. No. 5,707,949). Alternatively, dye-transfer inhibiting polymers that have been immobilised on a fabric substrate have been used (see, for instance, WO 1996/026831, WO 1997/048789, WO 2012/107405 A1, WO 2015/082251 A1, WO 2015/82251 A1 and WO 2008/057287 A1). A problem with both of these methods is that the materials used are not generally reusable. A problem with using a fabric substrate embedded or impregnated with dye-transfer inhibiting polymers is the relatively complicated and energy-intensive method of production. For example, in WO 1997/048789, a cellulosic substrate is passed through a bath containing an alkaline solution of an N-trisubstituted ammonium 2-hydroxy-3-halopropyl compound or a salt of epoxy propyl-ammonium, after which it is subjected to a pressure of between 0.69-1.37 MPa (100-200 psi) and then heated to a temperature of approximately 35° C. Thereafter, the substrate is wrapped in a water impermeable material and rotated at a temperature of between 15° C. and 100° C. for a period of between 1 hour and 12 hours. The water impermeable material is removed, while the substrate is passed through an acid bath, subjected to a pressure of between 1.03-1.72 Mpa (150-250 psi) and finally dried. Another problem with using a fabric substrate embedded or impregnated with dye-transfer inhibiting polymers is that the sheets can become stuck in the fabric that is being washed, or in the filter or drum of a washing machine. If the sheet becomes stuck in the drum, it can potentially cause a problem during subsequent washes due to redeposition or desorption of the dye.

Using hydrogels to remove dyes from solution has been investigated. However, examples of hydrogels investigated to date generally suffer from problems with stability at high wash temperatures, biodegradability and presence of toxic substances (X. Qi et al., Colloids and Surfaces B: Biointerfaces 170 (2018) 364-372, Y. S. Jeon et al., Journal of Industrial and Engineering Chemistry 14 (2008) 726-731, H. Tu, Polymer Chemistry 8 (2017) 2913-2921.)

There exists a clear need for a dye scavenger that is reusable, simpler and more energy-efficient to prepare, and biodegradable.

SUMMARY OF THE INVENTION

The present invention provides a dye scavenger comprising a biodegradable hydrogel, wherein the hydrogel comprises: a first polymer chemically cross-linked by a cross-linker. The term "chemically cross-linked" denotes a structure in which the components of the hydrogel, that is, the first polymer and the cross-linker, are linked to each other by chemical bonds. By chemically cross-linking the first polymer, a rigid, porous, three-dimensional structure is obtained enabling the hydrogel to swell and trap dyes and other items present in the water. The dye scavenger is stable over a wide range of temperatures. The dye scavenger according to the present invention removes dyes present in the wash water, avoiding colouration of the source fabric or other fabrics being washed with the source fabric to preserve satisfactory laundry appearance. Since the hydrogel itself is a dye scavenger, there is no need for an extra substrate or carrier. The use of a hydrogel allows for fast removal of dyes, which might be necessary for shorter wash cycles. The dye scavenger is reusable without loss of efficiency, which is desirable from a cost and environmental perspective. After use, the dye scavenger is biodegradable, which is desirable from an environmental perspective.

The dye scavenger preferably further comprises a second polymer.

From an environmental perspective, it is preferred that the first polymer is a natural polymer. More preferably, the first polymer is selected from alginic acid and salts thereof, cellulose, lignin, bacterial nanocellulose, type A gelatin, type B gelatin, chitin, chitosan, pectin, natural gum, other protein or starch, and derivatives thereof, or combinations thereof. It is also preferred that the second polymer, when present, is a natural polymer. More preferably, the second polymer is also selected from alginic acid and salts thereof, cellulose, lignin, bacterial nanocellulose, type A gelatin, type B gelatin, chitin, chitosan, pectin, natural gum, other protein or starch, and derivatives thereof, or combinations thereof.

In a preferred embodiment, one of the first polymer and the second polymer is sodium alginate. Sodium alginate provides steric stabilisation and inhibits agglomeration of the hydrogel. In another preferred embodiment, one of the first polymer and the second polymer is chitosan. Preferably, the first polymer is chitosan and the second polymer is sodium alginate.

Preferably, the cross-linker is selected from an acid such as 2-hydroxypropane-1,2,3-tricarboxylic acid, 1,5-pentanedial, methylene glycol, an epoxy compound, an acrylamide derivative such as N-[(Prop-2-enoylamino)methyl]prop-2-enamide, a polyacid, a saccharide, a plant extract, and derivatives thereof. More preferably, the cross-linker is a plant extract. Most preferably, the cross-linker is (methyl (1R,2R,6S)-2-hydroxy-9-(hydroxymethyl)-3-oxabicyclo [4.3.0]nona-4,8-diene-5-carboxylate), referred to hereinafter as “genipin”. Genipin degrades slowly and is non-toxic relative to other known cross-linkers.

In one embodiment, the dye scavenger further comprises an additional laundry additive. The additional laundry additive can be selected from a filler, fragrance, antimicrobial agent, enzyme, fabric softener, water softener, anti-soil re-deposition agent, preservative, colour, optical brightener, anionic surfactant, cationic surfactant, non-ionic surfactant, amphoteric surfactant, ethanoic acid, and 2-hydroxypropane-1,2,3-tricarboxylic acid. When additional laundry additives are used, the dye scavenger according to the present invention offers other functions and benefits in addition to being a dye scavenger, and may thus replace or supplement other components, e.g. conventional softeners, optical brighteners, anti-soil re-deposition agents, and/or antimicrobial agents.

In a preferred embodiment, the dye scavenger is in the form of hydrogel beads. Hydrogel beads can be usefully incorporated within a dye-scavenging device or added to a laundry washing powder.

In a preferred embodiment, the hydrogel has a pore size of from about 0.01 μm to about 100 μm, preferably 1 to 50 μm. When the pore size is less than about 0.01 μm, the permeability of the hydrogel to the dye solution can be lowered, thereby reducing the efficiency of dye uptake. When the pore size is greater than about 100 μm, the mechanical properties of the hydrogel may worsen.

The present invention also provides a method of preparing a dye scavenger comprising a biodegradable hydrogel comprising the steps of: (a) providing a solution of a first polymer and a cross-linker; (b) forming the hydrogel; and (c) isolating the hydrogel. This method can be carried out in an energy efficient way. Production of a hydrogel can, for instance, take place at 25° C. and atmospheric pressure without use of specialised equipment.

Preferably, the solution in step (a) further comprises a second polymer.

In one embodiment, step (a) comprises the steps of: (a1) providing a first solution of a first polymer and a cross-linker; (a2) providing a second solution of a second polymer; and (a3) combining the first solution and the second solution.

In one embodiment the first polymer is present in the first solution in a range of from about 0.1 to about 5.0% by mass based on the mass of the first solution. The second polymer, when present, is also preferably present in the second solution in a range of from about 0.1 to about 5.0% by mass based on the mass of the second solution.

In another embodiment, the cross-linker is present in the first solution in a range of from about 0.05 to about 2.0% by mass based on the mass of the first polymer.

In one embodiment, the hydrogel can be as defined above.

The invention also provides a dye scavenger comprising a biodegradable hydrogel as defined above prepared by a method as defined above.

The invention also provides a dye-scavenging device comprising: a housing that is permeable to a dye solution; the housing containing a dye scavenger comprising a hydrogel. The dye-scavenging device can be placed in a washing machine drum with laundry. At the end of the washing process, the dye-scavenging device can be removed and kept until the next wash. It is easy to use and reusable. By encasing the hydrogel within the housing, it is possible to prevent the hydrogel from becoming stuck in the fabric that is being washed, or in the filter or drum of the washing machine. It can therefore move through the whole drum allowing water to flow through it. Because the device is unlikely to become stuck in the drum, it is less likely that the user will forget to remove the device at the end of the wash, and unwanted redeposition or desorption of the dye in subsequent washes can be avoided. The dye-scavenging device provides a higher surface area for dye adsorption compared with a fabric substrate embedded or impregnated with dye-transfer inhibiting polymers.

In a preferred embodiment, the housing is a perforated ball. A ball is less likely to catch fabrics or other items present in the drum of the washing machine or cause damage to the inside of a washing machine drum.

The dye-scavenging device preferably contains a dye scavenger as described above.

The present invention also provides a laundry composition comprising a dye scavenger as defined above.

BRIEF DESCRIPTION OF THE DRAWINGS

FIG. 1 is a graph showing the efficiency of dye absorption of a dye scavenger according to the present invention.

DETAILED DESCRIPTION

The dye scavenger according to the invention comprises a biodegradable hydrogel, wherein the hydrogel comprises: a first polymer chemically cross-linked by a cross-linker. The dye scavenger optionally further comprises a second polymer.

Hydrogels according to the present invention can take up large amounts of water and any solutes or particles suspended in it. For example, a hydrogel can take up to 1.1 to 1000 times its dry mass in water, while the shape is kept constant. Depending on the production process and the materials used for preparation, the swelling rate of hydrogels ranges from a fraction of a minute to hours. In addition, monomers and polymers with which cross-linking can be achieved have a very high affinity for dyes and other items present in wash water, increasing the hydrogel efficiency. The dye scavenger can absorb and/or adsorb, trap or make interactions (e.g. via hydrogen bonds, ion-ion, ion-dipole, etc.) with dyes and other items present in wash water.

Examples of polymers suitable as the first polymer and/or the second polymer include linear or branched, condensation or addition polymers and their derivatives. Preferably, hydrophilic polymers are used.

Preferably, a substantial portion of the monomeric units constituting the first polymer and/or the second polymer contain ionic or ionisable groups, or both, which are soluble in aqueous and/or acidic solutions. Examples of ionic or ionisable groups include amine groups, including primary, secondary, tertiary amines and quaternary amine salts, carboxylic acid groups, aromatic hydroxyl groups, such as phenols, sulfonic acid groups, sulfonamide groups, and amide groups. The presence of ionic or ionisable groups increases affinity for dyes and any other solutes or particles suspended in the water, increasing the efficiency of dye uptake. The dye scavenger can thus absorb and/or adsorb dyes and other solutes or particles suspended in wash water via e.g. hydrogen bonds, ion-ion interactions, ion-dipole interactions. The first polymer and/or second polymer may be a polyelectrolyte whose repeating units bear an ionisable group. Alternatively, the first polymer and/or the second polymer may be an ionic polymer. When an ionic polymer is used, provided that ionic groups are present in a sufficient amount, not every repeating unit needs to include an ionic group.

Any polymer is suitable provided that it is capable of forming biodegradable three-dimensional structures. The hydrogel may comprise natural and/or synthetic polymers. Examples of natural polymers are alginic acid and salts thereof, cellulose, lignin, bacterial nanocellulose, type A gelatin, type B gelatin, chitin, chitosan, pectin, natural gum, protein, starch, and derivatives thereof. Examples of synthetic polymers include acrylic polymers, vinyl polymers, poly (ethylene glycols), polyhydroxyalcanoates, polylactides, polycaprolactones, poly(vinyl alcohol) and others. A combination of natural polymers, synthetic monomers and/or synthetic polymers may be used. In a preferred embodiment, the first polymer and/or the second polymer are natural polymers, because they are biodegradable and environmentally friendly. In a preferred embodiment, the first polymer is chitosan. In another preferred embodiment, the second polymer is sodium alginate. In a most preferred embodiment, one of the first polymer or the second polymer is sodium alginate and the other of the first polymer or the second polymer is chitosan.

As used herein, chitosan is a linear polysaccharide composed of β-(1→4)-linked D-glucosamine and N-acetyl-D-glucosamine, where D-glucosamine is a compound having the chemical formula (3R,4R,5S)-3-Amino-6-(hydroxymethyl)oxane-2,4,5-triol.

It will be appreciated that it is not particularly important which polymer is designated the first polymer or the second polymer, and any reference to the "first polymer" shall be construed as including a reference to "one of the first polymer or the second polymer" and any reference to the "second polymer" should be construed as including a reference to "the other of the first polymer or the second polymer".

Cross-Linking of the Polymer

The dye scavenger according to the invention comprises a hydrogel comprising a first polymer chemically cross-linked by a cross-linker. Such polymers are cross-linked by covalent bonds and are insoluble in water.

The cross-linker may be any cross-linker that provides a biodegradable hydrogel. For example, the cross-linker may be an inorganic or organic molecule, and may be a multi-functional monomer or natural or synthetic polymer. The cross-linker may be selected from an acid such as 2-hydroxypropane-1,2,3-tricarboxylic acid, 1,5-pentanedial, methylene glycol, an epoxy compound, an acrylamide derivative such as N-[(prop-2-enoylamino)methyl]prop-2-enamide, a polyacid, a saccharide, a plant extract, and derivatives thereof. Preferably, the cross-linker is a natural compound. Preferably, the cross-linker is a plant extract. Most preferably, the cross-linker is genipin.

Cross-linkers also include monomers from which cross-linking can be achieved, including vinyl and acrylic monomers such as prop-2-enamide, 1-propene-2-3-dicarboxylic acid, 2-methyl-2-propenoic acid, prop-2-enoic acid and derivatives of the aforementioned monomers.

Genipin is an extract from the fruit *Gardenia* Jasminoides Ellis. It is known to react with primary and secondary amine groups. It degrades slowly and is non-toxic relative to other known cross-linkers. One molecule of genipin forms a single bifunctional cross-link between two chains of polymer.

An important property that influences the efficiency of dye uptake by the dye scavenger is the degree of swelling. The degree of swelling is the amount by which the hydrogel can swell in water relative to a dry sample. The degree of swelling of a hydrogel sample can be expressed in terms of the ratio of the mass of the swollen hydrogel sample to the mass of the dry hydrogel sample. Preferably, the degree of swelling is from about 50 times to about 150 times with respect to the mass of the dry sample. More preferably, the degree of swelling is from about 60 times to about 100 times with respect to the mass of the dry sample.

Another important property that influences the efficiency of dye uptake by the dye scavenger is the average pore size of the pores defined by the hydrogel network. The average pore size according to the equilibrium swelling theory is 0.01 μm to 100 μm, preferably from 1 μm to 50 μm. The equilibrium swelling theory is well known in the field of polymer science (see, for instance, L. Brannon-Peppas et al., Chemical Engineering Science 46 (1991) 0.715-722, and L. M. Lira et al., European Polymer Journal, 45 (2009), 1232-1238).

The degree of swelling and the average pore size are influenced by the degree of cross-linking in the hydrogel, i.e. the amount of cross-linkers. Increasing the degree of cross-linking generally decreases the degree of swelling and the pore size, and vice versa. The degree of cross-linking can be expressed in terms of the mass ratio of polymer to cross-linker and is preferably from about 30 to about 1, more preferably from about 6 to about 1.

Additional Laundry Additives

In addition to a being a dye scavenger, the dye scavenger of the invention can also act as a fabric softener and/or water softener and/or optical brightener and/or redeposition agent and/or antimicrobial agent by including one or more additional laundry additives. Laundry additives are well known in the art, and can be selected from a filler, fragrance, antimicrobial agent, enzyme, fabric softener, water softener, anti-soil re-deposition agent, preservative, colour, optical brightener, anionic surfactant, cationic surfactant, non-ionic surfactant, amphoteric surfactant, ethanoic acid, and 2-hydroxypropane-1,2,3-tricarboxylic acid.

The dye scavenger can also act as a colour catcher and an antimicrobial agent, where the antimicrobial agent is released from the hydrogel during the washing process and affects microbes present in the wash water. This improves the efficiency of a detergent throughout the wash process, especially at low washing temperatures. The microbial agent can be selected from titanium dioxide, zinc oxide, silver ions, zinc ions, silver nanoparticles, zinc nanoparticles and others. Preferably, the antimicrobial agent is silver or zinc ions.

The addition of fillers to the dye scavenger can enhance its efficiency and/or mechanical properties. The fillers can be selected from natural and synthetic zeolites, fullerenes, nanotubes, talc, chalk, kaolin, titanium dioxide, zinc oxide, zinc ions, silver ions, silver nanoparticles, zinc nanoparticles, hydroxyapatite, sodium carbonate, sodium bicarbonate, sodium sulphate, sodium chloride, potassium carbonate, potassium bicarbonate, potassium sulphate, potassium chloride and others. Preferably, the filler is a synthetic zeolite, such as hydrophilic zeolite A or hydrophobic ZSM-5.

Shape of the Hydrogel

The dye scavenger according to the invention can be provided in the form of hydrogel beads. The beads are preferably substantially spherical or spherical in shape. The diameter of the beads can be tuned according to need, and may for example be from about 1 mm to about 10 mm in diameter. However, the dye scavenger can be provided in various shapes, for example hydrogel discs, sheets, films etc. without substantially affecting its properties, function and efficiency. The precise shape, size and amount of the dye scavenger will depend on the application.

Preparation of Dye Scavenger

A method of preparing a dye scavenger comprising a biodegradable hydrogel according to the invention comprises the steps of: (a) providing a solution of a first polymer and a cross-linker; (b) forming the hydrogel; and (c) isolating the hydrogel. The method preferably comprises the steps of: (a) providing a solution of a first polymer, a second polymer and a cross-linker; (b) forming the hydrogel; and (c) isolating the hydrogel.

In one embodiment, step (a) comprises the steps of: (a1) providing a first solution of a first polymer and a cross-linker; (a2) providing a second solution of a second polymer; and (a3) combining the first solution and second solution.

The first polymer, second polymer and cross-linker are as described above.

The concentrations of the first polymer in the first solution and/or the second polymer in the second solution range from about 0.1% to about 5.0% by mass based on the mass of the solution, preferably from about 0.5% to about 3.0%, more preferably from about 1.5% to about 2.5%.

In the above embodiments, the solutions of the first polymer and/or the second polymer may be provided by dissolving a preformed polymer. Alternatively, the solutions of the first polymer and/or the second polymer may be provided by dissolving monomers and an initiator, which react to provide the first polymer and/or the second polymer. When monomers are used, they may be selected from vinyl and acrylic monomers such as prop-2-enamide, 1-propene-2-3-dicarboxylic acid, 2-methyl-2-propenoic acid, prop-2-enoic acid and related derivatives of the aforementioned monomers.

When monomers are used instead of a preformed polymer, the concentration of monomer in solution ranges from about 0.1% to about 5.0% by mass based on the mass of the solution, preferably from about 0.5% to about 3.0%, more preferably from about 1.5% to about 2.5%. When monomers are used instead of preformed polymer, initiator is included in the solution in an amount of from 0.1% to 1.0% by mass based on the mass of the solution.

It will be appreciated that it is not particularly important which solution is designated the first solution or the second solution, and any reference to the “first solution” shall be construed as including a reference to “one of the first solution or the second solution” and any reference to the “second solution” should be construed as including a reference to “the other of the first solution or the second solution”.

In an embodiment, the cross-linker is added in an amount of from about 0.05% to about 2.00% by mass based on the mass of the first polymer, for example from about 0.5% to about 1.5%.

In step (b), the dye scavenger can be formed immediately upon providing a solution of a first polymer and a cross-linker; a solution of a first polymer, second polymer and a cross-linker; a solution of a monomer, an initiator and a cross-linker; or a solution of a monomer, an initiator, a first polymer and a cross-linker. Alternatively, the hydrogel may take time to form by cross-linking and/or polymerisation. In either case, the hydrogel may be agitated, for example, by stirring or shaking for a period of time. An air shaker can be used. The period of time can range from 30 minutes to 48 hours, preferably 1 hour to 36 hours, more preferably 20 to 28 hours. The hydrogel can be formed at any temperature, such as 5° C. to 90° C., preferably 10° C. to 40° C., more preferably 15° C. to 30° C., most preferably room temperature (i.e. 20° C. to 25° C.). An advantage of the invention is that the dye scavenger can be formed at room temperature or ambient temperature.

The method of preparing the dye scavenger may be carried out at any pH. In a preferred embodiment, the pH of the solution will be from about 3.0 to about 9.0, preferably from about 3.5 to about 6.0.

Although specific embodiments of the invention are described by reference to solution-phase polymerisation, the preferred solvent being water, the dye scavenger could be prepared by suspension or emulsion polymerisation with the appropriate equipment.

The composition of the dye scavenger is determined by the relative amounts of each component included in the solution. In general, from about 80% to about 95% of the initial amount of the first polymer and the cross-linker and the second polymer, when present, is incorporated into the hydrogel.

Dye-Scavenging Device

The invention also provides a dye-scavenging device comprising: a housing that is permeable to a dye solution; the housing containing a dye scavenger comprising a hydrogel.

The precise shape of the housing is not particularly limited, provided that it is configured to be permeable to a dye solution and retain the hydrogel. In a preferred embodiment, the housing is a perforated ball, although the housing may also be in the shape of a cube, block, bag or any other shape. The one or more perforations may be any shape or size, provided that they are configured to be permeable to a dye solution and retain the hydrogel. The one or more perforations may be uncovered holes or they may be covered with mesh or fabric. When the one or more perforations are uncovered holes, they should not exceed the diameter of the hydrogel pieces contained within.

The housing may be made of any material, such as plastics or fabric.

The dye-scavenging device preferably contains a dye scavenger as described above.

In use, the dye-scavenging device is placed in the washing machine drum with the fabrics to be washed. During washing, dyes may be released from the fabric into the wash water to form a dye solution. The dye solution can permeate through the housing of the dye-scavenging device and contact the dye scavenger. The dye scavenger can absorb and/or adsorb, trap or make interactions (e.g. via hydrogen bonds, ion-ion, ion-dipole, etc.) with the dye to remove it from the wash water, and thereby prevent transfer onto the source fabric or other fabrics.

Laundry Composition

The invention also provides a laundry composition comprising a dye scavenger according to the invention. The laundry composition may be in the form of a laundry powder, laundry liquid, or laundry tablet. The laundry composition may comprise any one or more of the additional laundry additives as described above.

EXAMPLES

The present invention will now be described by reference to the following non-limiting examples.

Example 1: Preparation of Dye Scavenger

A dye scavenger comprising a biodegradable hydrogel can be prepared according to the following method. A first solution is provided containing a first polymer in an amount of from 0.1% to 5.0% by mass based on the mass of the solution and a cross-linker in an amount of from 0.05% to 2.00% based on the mass of the first polymer. A second solution is provided containing a second polymer in an amount of from 0.1% to 5.0% by mass based on the mass of the solution. The first solution is added to the second solution in a ratio of 1:1 by volume. Beads of hydrogel are formed immediately and left on an air shaker for 24 hours at 25° C. to allow cross-linking to occur. The beads of dye scavenger are removed and rinsed in water. The dye scavenger is ready to use.

Example 2: Preparation of an Antimicrobial Dye Scavenger

An antimicrobial dye scavenger comprising a biodegradable hydrogel can be prepared according to the following method. A first solution is provided containing a first polymer in an amount of from 0.1% to 5.0% by mass based on the mass of the solution and a cross-linker in an amount of from 0.05% to 2.00% based on the mass of the first polymer. A second solution is provided containing a second polymer in an amount of from 0.1% to 5.0% by mass based on the mass of the solution and an antimicrobial agent in an amount of from 1% to 10% by mass based on the mass of the solution. The first solution is added to the second solution in a ratio of 1:1 by volume. Beads of hydrogel are formed immediately and left on an air shaker for 24 hours at 25° C. to allow cross-linking to occur. The beads of dye scavenger are removed and rinsed in water. The dye scavenger is ready to use.

Example 3: Preparation of Dye Scavenger with Filler

A dye scavenger comprising a biodegradable hydrogel and a filler can be prepared according to the following method. A first solution is provided containing a first polymer in an amount of from 0.5% to 3.0% by mass based on the mass of the solution and a cross-linker in an amount of from 0.05% to 2.00% based on the mass of the first polymer. A second solution is provided containing a second polymer in an amount of from 0.1% to 5.0% by mass based on the mass of the solution and zeolite as filler in an amount of from 1% to 10% by mass based on the mass of the solution. The first solution is added to the second solution in a ratio of 1:1 by volume. Beads of hydrogel are formed immediately and left on an air shaker for 24 hours at 25° C. to allow cross-linking to occur. The beads of dye scavenger are removed and rinsed in water. The dye scavenger is ready to use.

Example 4: Preparation of Dye Scavenger with Fragrance

A dye scavenger comprising a biodegradable hydrogel and fragrance can be prepared according to the following method. A first solution is provided containing a first polymer in an amount of from 0.5% to 3.0% by mass based on the mass of the solution and a cross-linker in an amount of from 0.05% to 2.00% based on the mass of the first polymer. A second solution is provided containing a second polymer in an amount of from 0.1% to 5.0% by mass based on the mass of the solution. The first solution is added to the second solution in a ratio of 1:1 by volume: Beads of hydrogel are formed immediately and left on an air shaker for 24 hours at 25° C. to allow cross-linking to occur. The beads of dye scavenger are removed and rinsed in water. The beads are immersed in a fragrance solution and left for 1 hour. The dye scavenger is ready to use.

Example 5: Preparation of Dye Scavenger from a Monomer Solution and a Polymer Solution A dye scavenger comprising a biodegradable hydrogel can be prepared according to the following method. A monomer solution is provided containing a monomer in an amount of from 0.5% to 3% by mass based on the mass of the solution and an initiator in an amount of from 0.1% to 1.0% by mass based on the mass of the solution. A polymer solution is provided containing a polymer in an amount of from 0.5% to 3% by mass based on the mass of the solution and a cross-linker in an amount of from 0.05% to 2.00% based on the mass of the first polymer. The monomer solution is added to the polymer solution in a ratio of 1:1 by volume. Beads of hydrogel are formed immediately and left on an air shaker for 24 hours at 25° C. to allow polymerisation and cross-linking to occur. The beads of dye scavenger are removed and rinsed in water. The dye scavenger is ready to use.

Example 6: Preparation of a Dye Scavenger

A dye scavenger comprising a biodegradable hydrogel can be prepared according to the following method. A first solution is provided containing chitosan in an amount of 2% by mass based on the mass of the solution. A second solution is provided containing a sodium alginate in an amount of 1% by mass based on the mass of the solution and a cross-linker in an amount of 0.5% based on the mass of the first polymer. The first solution is added to the second solution in a ratio of 1:1 by volume. Beads of hydrogel are formed immediately and left on an air shaker for 24 hours at 25° C. to allow cross-linking to occur. The beads of dye scavenger are removed and rinsed in water. The dye scavenger is ready to use.

Example 7: Dye Scavenging Properties of Dye Scavenger

Hydrogel beads prepared according to Example 6 were tested for removal of dye C.I. Acid Orange 7 (AO7) from solutions prepared in tap water. Four different dye solutions were tested: a) AO7 in tap water in an amount of 10 ppm; b) AO7 in tap water in an amount of 10 ppm with the addition of washing powder (Persil Expert Regular Cold-Zyme, Stain Removal Booster by Henkel) in an amount of 3.32 mL of washing powder per 1 L of water; c) AO7 in tap water in an amount of 10 ppm with the addition of liquid detergent for coloured clothes (Perwoll Color Magic by Henkel) in an amount of 2 mL of liquid detergent per 1 L water); and d) AO7 in tap water in an amount of 10 ppm with the addition of liquid detergent for dark clothes (Perwoll Black Magic by Henkel) in an amount of 2 mL of liquid detergent per 1 L water.

Dye C.I. Acid Orange 7 (AO7) was selected because it is commonly used in dying of fabrics. An initial dye concentration of 10 ppm was selected because this is typically the maximum dye concentration that is found in the wash water of a typical washing machine. The typical dye concentration is between 1 and 10 ppm.

The dye concentration was observed over 60 minutes. The results are shown in FIG. 1. After 60 minutes, the hydrogel beads absorbed almost all of the dye.

INDUSTRIAL APPLICABILITY AND ALTERNATIVE APPLICATIONS

The dye scavenger according to the present invention is useful for preventing dye transfer between fabrics in laundry and for removing dyes from waste water. The dye scavenger may be used in a dye-scavenging device or it may be added to a laundry composition.

Although the present invention is described as being useful in washing or laundry processes, it will be apparent to those skilled in the art that it can also be used in situations other than in laundry where dyes are present. For example, the dye scavenger of the present invention could be used to clean up waste streams from industrial waste flows comprising dyes. The present invention may be used as part of waste water treatment equipment, for example in a semi-permeable membrane of filter.

The invention claimed is:

1. A dye scavenger comprising a biodegradable hydrogel, wherein the hydrogel comprises:

a first polymer chemically cross-linked by a cross-linker, a second polymer different from the first polymer, a laundry additive comprising a fragrance, enzyme, fabric softener, water softener, anti-soil re-deposition agent, optical brightener, ethanoic acid and/or 2-hydroxypropane-1,2,3-tricarboxylic acid, wherein the hydrogel has a pore size of from about 0.01 μm to about 100 μm, and wherein the biodegradable hydrogel has a degree of crosslinking based on a mass ratio of the first polymer to cross-linker from about 30 to about 1.

2. The dye scavenger according to claim 1, wherein the first polymer is a natural polymer.

3. The dye scavenger according to claim 1, wherein the first polymer is selected from alginic acid and salts thereof, cellulose, lignin, bacterial nanocellulose, type A gelatin, type B gelatin, chitin, chitosan, pectin, natural gum, protein, starch, and derivatives thereof.

4. The dye scavenger according to claim 1, wherein the first polymer is chitosan.

5. The dye scavenger according to claim 1, wherein the second polymer is a natural polymer.

6. The dye scavenger according to claim 1, wherein the second polymer is selected from alginic acid and salts thereof, cellulose, lignin, bacterial nanocellulose, type A gelatin, type B gelatin, chitin, chitosan, pectin, natural gum, protein, starch, and derivatives thereof.

7. The dye scavenger according to claim 1, wherein the second polymer is sodium alginate.

8. The dye scavenger according to claim 1, wherein the cross-linker is selected from an acid 1,5-pentanedial, methylene glycol, an epoxy compound, an acrylamide derivative, a polyacid, a saccharide, a plant extract, or derivatives thereof.

9. The dye scavenger according to claim 8, wherein the acid is 2-hydroxypropane-1,2,3-tricarboxylic acid, and wherein the acrylamide derivative is N-[(prop-2 enoylamino)methyl]prop-2-enamide.

10. The dye scavenger according to claim 1, wherein the cross-linker is a plant extract.

11. The dye scavenger according to claim 1, wherein the cross-linker is genipin.

12. The dye scavenger according to claim 1, wherein the laundry additive further comprises a filler, antimicrobial agent, preservative, colour, anionic surfactant, cationic surfactant, non-ionic surfactant, and/or amphoteric surfactant.

13. The dye scavenger according to claim 1, wherein the hydrogel has a pore size from about 1 to 50 μm.

14. The dye scavenger according to claim 1 that is in the form of hydrogel beads.

15. A method of preparing the dye scavenger according to claim 1 comprising the steps of:

(a) providing a solution of the first polymer and the cross-linker;

(b) forming the hydrogel; and (c) isolating the hydrogel;

wherein step (a) comprises the steps of:

(a1) providing a first solution of the first polymer and the cross-linker;

(a2) providing a second solution of the second polymer; and (a3) combining the first solution and the second solution.

16. A method according to claim 15, wherein the first polymer is present in the first solution in a range of from about 0.1 to about 5.0% by mass based on the mass of the first solution and the second polymer is present in the second solution in a range of from about 0.1 to about 5.0% by mass based on the mass of the solution.

17. A method according to claim 15, wherein the cross-linker is present in the first solution in a range of from about 0.05% to about 2.0% by mass based on the mass of the first polymer.

18. A laundry composition comprising the dye scavenger according to claim 1.

19. A dye-scavenging device comprising:

a housing that is permeable to a dye solution;

the housing containing the dye scavenger according to claim 1.

20. The dye-scavenging device according to claim 19, wherein the housing is a perforated ball.

* * * * *